US008688782B1

(12) United States Patent
Lin et al.

(10) Patent No.: US 8,688,782 B1
(45) Date of Patent: Apr. 1, 2014

(54) SOCIAL GROUP SUGGESTIONS WITHIN A SOCIAL NETWORK

(75) Inventors: Jennifer W. Lin, San Jose, CA (US); Kaisuke Nakajima, San Jose, CA (US)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/605,758

(22) Filed: Sep. 6, 2012

Related U.S. Application Data

(60) Provisional application No. 61/650,348, filed on May 22, 2012.

(51) Int. Cl.
*G06F 15/16* (2006.01)

(52) U.S. Cl.
USPC ............ 709/204; 709/203; 709/205; 709/213

(58) Field of Classification Search
None
See application file for complete search history.

(56) References Cited

U.S. PATENT DOCUMENTS

| | | | |
|---|---|---|---|
| 7,707,246 B1 | 4/2010 | Issa et al. | |
| 7,970,877 B1 | 6/2011 | Ponna | |
| 8,010,691 B2 | 8/2011 | Kollmansberger et al. | |
| 2005/0113147 A1* | 5/2005 | VanEpps et al. | 455/567 |
| 2008/0133658 A1* | 6/2008 | Pennington | 709/204 |
| 2009/0141940 A1* | 6/2009 | Zhao et al. | 382/103 |
| 2009/0245573 A1* | 10/2009 | Saptharishi et al. | 382/103 |
| 2010/0036967 A1* | 2/2010 | Caine et al. | 709/236 |
| 2011/0137989 A1* | 6/2011 | Kiciman et al. | 709/204 |
| 2011/0188742 A1 | 8/2011 | Yu et al. | |
| 2012/0054691 A1* | 3/2012 | Nurmi | 715/854 |

OTHER PUBLICATIONS

Facebook Help Center, "How do I share a photo or photo album with someone?" retrieved from http://www.facebook.com/help/?faq=154716187927788, accessed on Aug. 31, 2012, 1 pp.
Falconer, "Google's mysterious Photovine website is live, and it looks like a social photo-sharing service," Jul. 12, 2011, retrieved from http://thenextweb.com/google/2011/07/12/googles-mysterious-photovine-website-is-live-and-it-looks-like-a-social-photo-sharing-service/, 3 pp.

* cited by examiner

*Primary Examiner* — Djenane Bayard
(74) *Attorney, Agent, or Firm* — Shumaker & Sieffert, P.A.

(57) ABSTRACT

In one example, a method includes receiving, by a first computing device and from a second computing device, an image comprising an object. A user may be associated with a social networking service and the second computing device. The method further includes selecting a social group associated with the user in the social networking service. The selection may be based at least in part on one or more characteristics associated with the object. The method also includes sending, by the first computing device to the second computing device, an indication of the social group selected by the first computing device.

29 Claims, 5 Drawing Sheets

SOCIAL GROUP SUGGESTIONS WITHIN A SOCIAL NETWORK

CROSS-REFERENCE TO RELATED APPLICATIONS

This application claims the benefit of U.S. Provisional Application No. 61/650,348, filed May 22, 2012, the entire content of which is incorporated herein in its entirety.

BACKGROUND

Computers and mobile devices, such as cellular phones and personal digital assistants, have made keeping in touch with acquaintances via a social network possible. In one example, web-based "social network" applications can enable a user to find other users' accounts and voluntarily become acquaintances. Users can share information with their acquaintances, such as messages and photos, allowing acquaintances to stay informed of their lives. The shared information is a tool for maintaining and strengthening social bonds.

Recently, creating special interest groups or sub-group(s) within a social network has become another popular form of social connection in social network and media sharing websites. The phrase "group" may include a social sub-community, or social sub-network, where members within a group share a characteristic, for example a common interest, value, ethnic or social background, or kinship tie. In this disclosure, the group is characterized by one or more commonly shared characteristics associated with its members. Creating groups within the user's social network is an organizational tool, especially useful when a user has many acquaintances in its social network, and a time saver for communicating with certain individuals.

SUMMARY

In one example, this disclosure is directed to a method including receiving, by a first computing device and from a second computing device, an image. The user may be associated with a social networking service and the second computing device. The method may also include identifying, by the first computing device, an object included in the image. The method may also include selecting, by the first computing device, a social group associated with the user in the social networking service, the selecting being based at least in part on one or more characteristics associated with the object. The method may further include sending, by the first computing device to the second computing device, an indication of the social groups selected by the first computing devices.

In another example, the disclosure is directed to a computer-readable storage medium encoded with instructions that, when executed, cause one or more processors of a computing device to perform operations, including receiving, by a first computing device and from a second computing device, a file, wherein a user is associated with a social networking service and the second computing device. The operations may further include identifying, by the first computing device, an object associated with the file. The computer-readable storage medium may include selecting, by the first computing device, a social group associated with the user in the social networking service, the selecting being based at least in part on one or more characteristics associated with the object. The computer-readable storage medium may also include sending, by the first computing device to the second computing device, an indication of the selected social group.

In another example, the disclosure is directed to a computing device may include one or more processors. The computing device may also include at least one or more modules operable by the one or more processors to send an image to a remote computing device, wherein an object is included in the image. The at least one or more modules may receive an indication of a social group associated with a user, wherein the user is associated with the computing device and a social networking service, the indicated social group being selected by the remote server based at least in part on one or more characteristics associated with the object. The at least one or more modules may further be operable by the one or more processors to receive an indication of user input to select the social group and send an indication of the social group selected by the user input to the remote computing device.

The details of one or more examples of the disclosure are set forth in the accompanying drawings and the description below. Other features, objects, and advantages will be apparent from the description and drawings, and from the claims.

DETAILED DESCRIPTION

Figure 1:
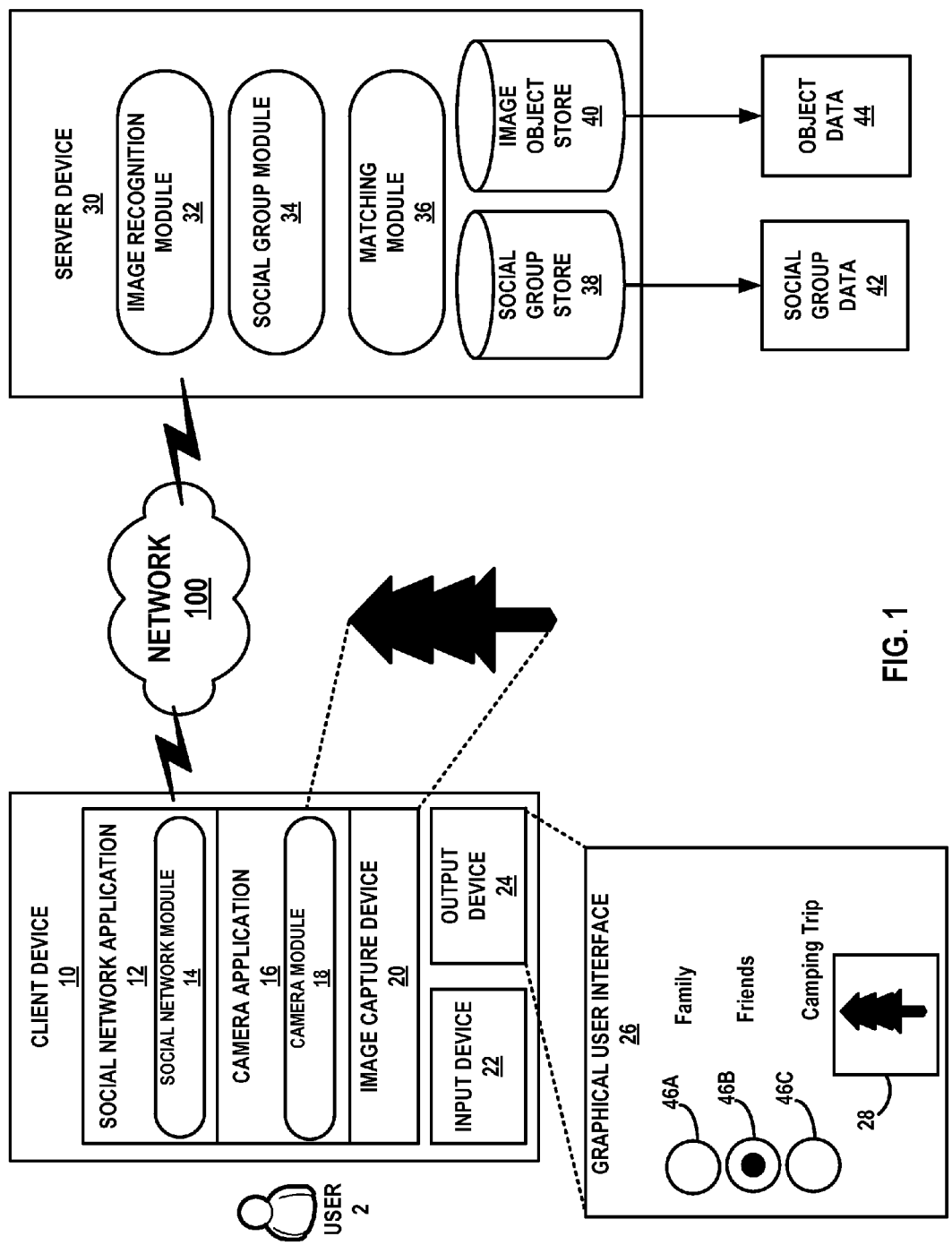
FIG. 1 is a conceptual diagram illustrating an example of a computing device, such as a client device, coupled to a server device that provides a computer implemented social networking service, in accordance with one or more aspects of the present disclosure.

In general, this disclosure is directed to techniques that may enable a user associated with a computing device (such as a smart phone, tablet, computer, or other commonly known computing devices) to quickly and easily select social groups with which to share a photo after the photo is taken. The computing device may include, for example, server and client devices. Social groups may be categories of a user's social network to which a user can assign their social networking contacts and better control the distribution and visibility of social networking posts.

Techniques of this disclosure for photo sharing with a social group may include determining when a user takes a photo and prompting the user to select suggested social groups based on information associated with objects in the photo. If the user does select one or more social groups to share the photo with, the user may also input data about the image or the graphical objects found within the image. The input data and any selected social groups may then be sent back to the server. The server may associate the photo with the selected social groups and the input data. Allowing the user to select social groups to share an image with client device allows the user more control of their social networking communication and also prevents access to images by each user in the social networking service that is not associated with the social group.

For example, after taking a photo with a mobile computing device, the mobile computing device may be configured to send the photo to a server implementing techniques of the present disclosure. The server may apply image recognition techniques to the photo to identify objects in the image. Using the image recognition techniques, the server may further identify characteristics associated with one or more graphical objects. In some examples, a characteristic may indicate a name of a graphical object in an image. The server may then compare the characteristics of the graphical objects with metadata of social groups (e.g., a social group name) associated with the user to generate a confidence value. The confidence value may indicate the likelihood that the photo may be associated with one or more of the social groups. Using a set of generated confidence values, the server may create a list of suggested social groups. The server may send identifiers that identify the suggested social groups to the mobile computing device. For example, if the recognized graphical object is a soccer ball and the user has a social group named "Soccer Fans," then the "Soccer Fans" social group will be a suggested social group to share the photo with.

When the identifiers of the suggested social groups are received by the mobile computing device, the user may be prompted to select the suggested social groups. If the user selects one or more social groups to associate with the photo, then the user may be prompted to input descriptive information about the image or the graphical objects found in the image (e.g. names, dates, times, titles, location, comments, etc.). The input data and any selected social groups may then be sent back to the server. The server may then associate the image with the selected social groups and the input data.

In some examples, the mobile computing device may also apply image recognition techniques locally to the photo to identify graphical objects and their related data, such as characteristics, metadata and confidence values. The mobile computing device may send the related data to the server to be used to generate the list of suggested social groups. The server will then use techniques, for example parsing and string matching, to generate a list of suggested social groups within the user's social network to share the image with. The list may be automatically displayed on a graphical user interface (GUI) of the user's mobile computing device. The term "image" as used herein is a broad term encompassing as its plain and ordinary meaning, including but not limited to files, such as one or more visual representations, such as a photo or video, or could encompass acoustic or sound recordings, digital recordings, or documents, or a combination thereof. A file may be adapted to any data that a client device or server device are capable of capturing, receiving or storing.

FIG. 1 is a schematic illustrating an example of a computing device, such as a client device 10, coupled to a server device 30 that provides a computer implemented social networking service, in accordance with one or more aspects of the present disclosure. As shown in FIG. 1, client device 10 may be associated with a user 2, and includes a social networking application 12, a social networking module 14, a camera application 16, a camera module 18, an image capture device 20, an input device 22, and an output device 24.

In one example, user 2 may provide a user input to camera application 16 that causes image capture device 20 to capture an image. Camera application 16 stores the image at client device 10 using a camera module 18. Camera module 18 may associate the image with descriptive information such as a number that uniquely identifies the image, the location where the image was captured using global positioning techniques, user defined tags, or any other data that is descriptive of the captured image. Client device 10 may later send the descriptive information to server device 30, which may associate the descriptive information with the image in the social networking service. The descriptive information may be associated with objects in the image as characteristics that server device 30 may later use to identify social groups having characteristics that match the descriptive information.

Client device 10, in some examples, contains a client side library that is integrated with camera application 16 that performs image recognition locally at client device 10. Alternatively, functionality of the client side library may be implemented at server device 30 to perform image recognition. In the current example of FIG. 1, social network application 12 sends the image to server device 30. Social network application 12 may automatically send the image in some examples, while in other examples social network application 12 may request a user input from user 2 to cause social network application 12 to send the image. In some examples, client device 10 may further send image characteristics, such as a number that uniquely identifies the image, the location where the image was captured using global positioning techniques, user-defined tags, or any other data that is descriptive of the captured image.

Upon receiving the image, server device 30 may perform one or more known image recognition techniques to identify objects in the image. For instance image recognition module 32 may generate one or more image signatures of digital image data corresponding to objects included in the image. More specifically, image recognition module 32 may select a portion of image data that represents an object from the image and generate a signature that represents the object. In the example of FIG. 1, image recognition module 32 may generate a signature of an object of a tree that is included in the image.

Image recognition module 32 of server device 30 may then compare the generated signature of the object to a group of predefined object signatures included in object data 44. Server device 30 may generate a confidence value that indicates a probability that the object signature of the image matches one or more object signatures included in object data 44 of image object store 40. When the probability of a match between the object signature of the image and an object signature of object data 44 is greater than a predefined value, image recognition module 32 selects the matching object signature of object data 44. In some examples, a confidence value may be between 0 and 1.0. When the confidence value is, for example, 0.75 and the predefined value is set at 0.70, then the probability is greater than the predefined value. Due to the greater probability confidence value of 0.75, image module 32 selects the matching object signature.

Image recognition module 32 may then determine characteristics associated with the matching object signatures of the objects identified in the image. The characteristics may include, an object identifier, object name, keywords associated with the matching object signature, etc. For instance, each matching object signature may be associated with an object identifier (e.g., "tree"). Image recognition module 32 then sends the characteristics associated with the selected objects to matching module 36 for continuing the selection of social group suggestions.

Social group module 34 may determine social groups of user 2 that correspond to the object characteristics received from image recognition module 32. For instance, when social network application 14 sends the image, social network application also sends user credentials associated with user 2's account in a social networking service provided by server device 30. Social group module 34 initiates matching by accessing a list of social groups associated with user 2 included in social group data 42. In some examples, social group data 42 may be stored in the social group store 38. Each social group of user 2 may be associated with characteristics, such as a group identifier, group name, keywords, etc. In some examples, a social group may be an association of one or more users in a social networking service. A social group may be identified by one or more group identifiers, group names, keywords, etc. In some examples, social group module 34 may create, modify, and delete social groups represented as data stored in social group store 38.

Matching module 36 may compare the characteristics of the matching object signatures with characteristics of social groups associated with user 2 to determine a match. For instance, matching module 36 may perform full and/or partial string matching to compare the characteristics associated with an object included in the image with the characteristics associated with one or more of the social groups associated with user 2. In one example, matching module 36 determines a confidence value that indicates a degree of similarity between the one or more characteristics associated with the selected object and one or more characteristics associated with the social group. The degree of similarity may be within a range of degrees of similarity. If matching module 36 determines the generated confidence value is greater than a predetermined value, matching module 36 may select the social group.

The matching techniques may be further illustrated in reference to FIG. 1. If a recognized object is a tree as shown in FIG. 1, image recognition module 32 may associate characteristics such as "Tree" with the object. Matching module 36 may determine that user 2 has a social group named "Parks." In the current example, the social group named "Parks" may have characteristics including "trees," "hiking," etc. that are associated with the social group. Matching module 36 may generate a confidence value by comparing the characteristics associated with the recognized object (e.g., "Tree") and comparing the characteristics with the name of social group associated with user 2 (e.g., "Parks"). The confidence value may indicate a likelihood that the image, which includes the tree object, is associated with the social group named "Parks." If the confidence value exceeds a predefined value, then matching module 36 may select the "Parks" social group as a suggested social group to with which to associate the photo. In some examples, the predefined value may be set by user 2 or module such as matching module 36 may generate the value.

Additional matching techniques may also be used to determine whether a social group matches an object in an image. For instance, if user 2 provides a user input via input device 22, such as tagging the image as "mother" and user 2 has a social group named "Family," then the "Family" social group will be suggested to user 2 to share the image with. Matching module 36 can use a dictionary or other associative word datastore to expand the word "Family" to all members of a family, such as father, sister, brother, children, kids, wife, husband, etc., so that there may be more terms to match against for finding suggested social groups. Matching module 36 may use word expansions to allow for commonly associated or interchangeable words to also be used in the matching process and enables suggested social groups of server device 30, or indications of social groups, to have a wider variety. Matching module 36 may also use word expansions to expand identified objects in an image, such as a "tree," to include people associated with the identified object, such as a "gardener" who may be associated with the "tree," as a word expansion technique for finding social groups that include those associated people. Other contextual matching techniques are further described in the example of FIG. 2.

When matching module 36 completes the matching process, it can generate an indication of a social group selected by matching module 36. For instance, matching module 36 can generate a list of selected social groups that have characteristics that match characteristics associated with objects included in an image. In some examples, matching module 36 sends indications all of the social groups associated with user 2 along with data that indicate which social groups were selected by matching module 26. Server device 30 can send the indications of the selected social groups to client device 10.

Social network module 14 receives the indications of the selected social groups suggested by matching module 36. In response to receiving the indications, social network module 14 may cause output device 24 to display graphical user interface (GUI) 26. Initially, GUI 26 may display the list of social groups 46A, 46B, 46C. Social groups 46A-46C may be social groups suggested by matching module 36 because the social groups included characteristics matching the characteristics associated with the image captured by image capture device 20. GUI 26 may allow user 2 to select social group 46B or deselect social 46A. Deselecting social groups may result in not sharing the image with the deselected social group. User 2 may also edit the list of social groups listed or decline to associate the image with some or all the social groups 46A, 46B, 46C suggested by the server device 30.

In some examples, GUI 26 initially displays all social groups in the social network of user 2. The suggested social groups appear in a different color or may be initially selected within the list. User 2 may select or deselect social groups appearing in the list of the social groups of user 2. This selection process allows user 2 to control his/her social network communications and prevent access to images by other users in the social networking service that are not associated with the social group. In another example, GUI 26 may allow user 2 to choose recipients who are not included among the indicated social groups and who may not be users of the social network of user 2. In such examples, user 2 may manually input an identifier (e.g., email address or social networking username) of the recipient at the display of GUI 26.

In another example, user 2 may also decline to share the image at all by providing a user input to cancel the display of GUI 26. If, alternatively, the user 2 chooses to share the image with one of the selected social groups suggested by the server device 30, user 2 may select one or more social groups. For example, a selection circle 46B may be checked by user 2, causing the circle 46B to have a smaller circle within it appear, identifying that the user 2 would like to share the image with this social group, called "Friends." The group "Friends" may include all members of user's 2 social network that user 2 has associated with that particular social group.

In some examples, user 2 may select the area where the suggested social groups appear, for example by tapping it to provide a user input, and may activate editing the list of suggested social groups. Tapping the area of text may bring up a different window or view at GUI 26 where user 2 may edit the list of social groups or enter additional non-listed social groups and non-listed recipients that user 2 wishes to share the image with. Once user 2 has selected or keyed in the social groups that it wishes to share the image with, user 2 may then provide a user input at input device 22 that causes social network module 14 to send indications of the selected social groups to server device 30 by pressing, for example, a button labeled "Done."

In some examples, GUI 26 may prompt user 2 to enter descriptive information about the location of the image, comments, and the list of suggested social groups received by the server device 30. For example, if the photo was taken during a family camping trip at Yosemite National Park, then user 2 may provide a user input, such as typing in text "Yosemite" or "Family Vacation" at input device 22. Social network module 14 may receive any text that user 2 inputs and associate the text with the image. The selected social groups are then sent by social network module 14 of client device 10 to server device 30 via network 100. Social group module 34 uses indications of the selected social groups from client device 10 to associate the image with indicated groups that were selected by the user. Social group module 34 may make updates to social group data 42, for example, to associate the image with social groups selected by user 2. At a later time, server device 30 may determine that another user in the social networking service is associated with the social group that was previously associated with the image. Because the user is included in the social group, server device 30 may send an indication of the image to a computing device associated with the user. For instance, server device 30 may display in a feed that the user 2 has posted an image. Alternatively, the user may browse user 2's images associated with the social group and view the picture because the user is included in the social group with which the image is associated. Server device 30 may also prevent a user from accessing the image associated with the social group if the user is not included in the social group.

In response to receiving selections of social groups from client device 10, social group module 34 may improve the matching of images and social groups by learning from indications of past user selections. For instance, server device 30 may compare the list of suggested social groups, which server device 30 initially sent to client device 10, with the selected social groups that user 2 chose to associate the image with. In some examples, social group module 34 may maintain a group matching score for each social group suggested by matching module 36. The group matching score may correspond to an association between the social group and an object that may be included in an image. For instance, a group matching score may correspond to an association between social group "Camping Trip" and an object identifier "tree." Group matching scores may be used to determine a propensity of user 2 to associate an image having a specified object with the social group and improve future suggestions.

In one example, when user 2 chooses to associate a social group that was initially suggested to be associated with the image, matching module 36 may increment the group matching score that corresponds to the object and social group. Server device 30 may also determine if a suggested social group was not selected by user 2. For instance, matching module 36 determines that a user has deselected a social group that was initially suggested by social group module 36, matching module 36 may decrement group matching score for the association between the object of the image and the social group. In some examples, matching scores associated with particular social groups can be stored in social group data 42 of server device 30. As further described herein, matching module 36 may use the group matching score when social group module 34 receives a subsequent image that includes the same object to determine whether to suggest the social group to the user again.

One or more of the various techniques of FIG. 1 performed by server device 30 may, in some examples, be performed at client device 10. For example, the image recognition techniques of image recognition module 32 may be performed by client device 10 and identifiers of the objects may be sent by client device 10 to server device 30 to perform social group suggestions. In some examples, client device 10 may also perform the techniques of the social group module 34 and/or matching module 30. Similarly, in some examples, server device 30 may perform one or more techniques of social network module 14 and camera module 18. In some examples, techniques of the disclosure may be extended generally to files, which may include photos, videos, or documents.

Techniques of this disclosure for photo sharing with a social group improves social networking by automatically suggesting social groups to share photos with after a photo is taken. Additionally, the disclosure improves the group suggestions by "learning" over time based on the ability of server device 30 to identify objects and indications of past user selections. The disclosure of automated social group suggestions also improves the control of social networking communication by preventing access to images by each user in the social networking service that is not associated with the social group.

Figure 2:
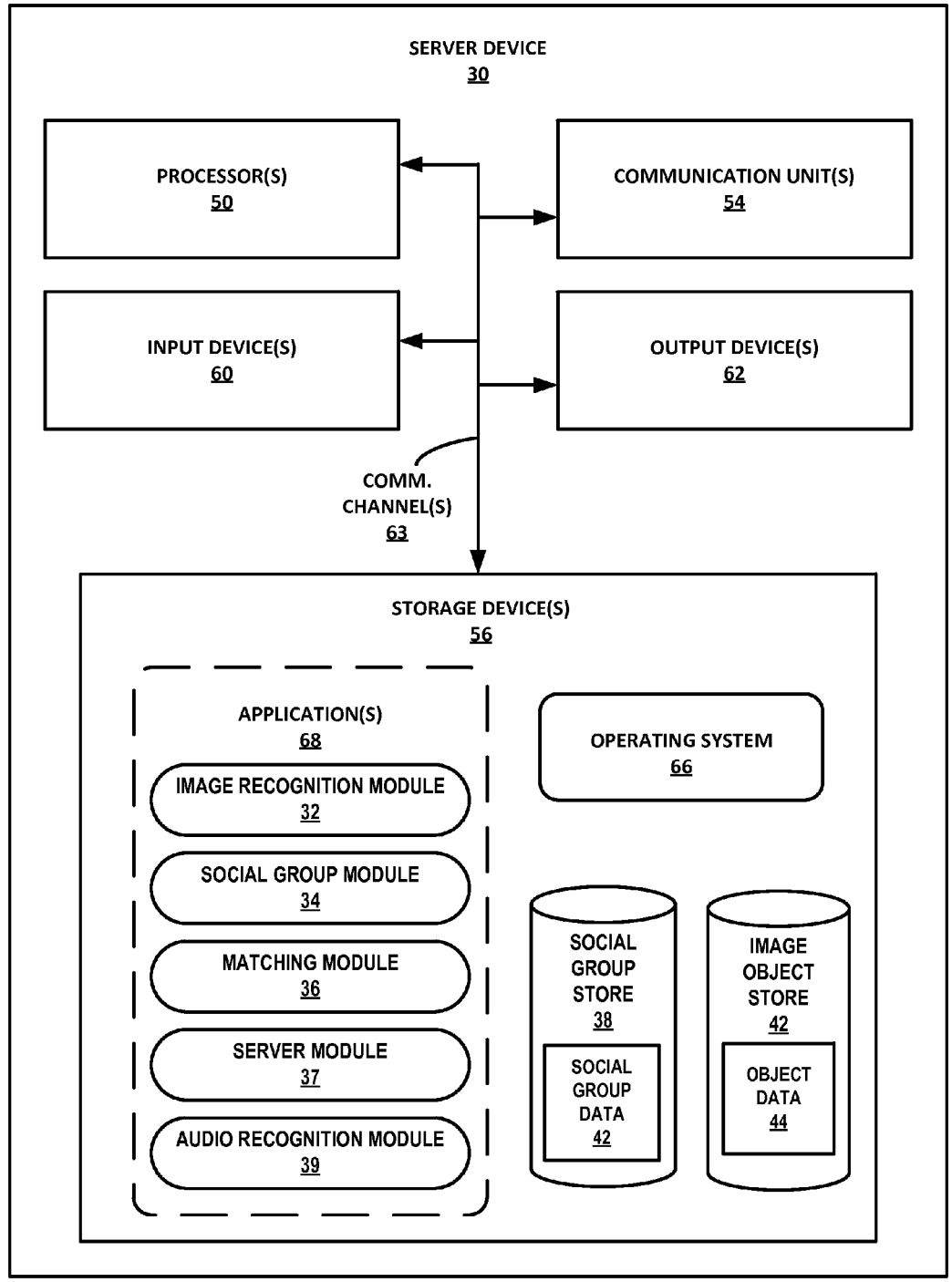
FIG. 2 is a block diagram illustrating an example of a server device that provides a computer implemented social networking service shown in FIG. 1, in accordance with one or more aspects of the present disclosure.

FIG. 2 is a block diagram illustrating further details of one example of a server device as shown in FIG. 1, in accordance with one or more aspects of the present disclosure. FIG. 2 illustrates only one particular example of server device 30, and many other examples of server device 30 may be used in other instances.

As shown in the specific example of FIG. 2, server device 30 includes one or more processors 50, a communication unit 54, one or more storage devices 56, an input device 60, and an output device 62. Server device 30, in one example, further includes applications 68 and operating system 66 that are executable by server device 30. Each of components 50, 60, 54, 62, and 56 may be interconnected (physically, communicatively, and/or operatively) for inter-component communications. In some examples, communication channels 63 may include a system bus, network connection, interprocess communication data structure, or any other channel for communicating data. As one example in FIG. 2, components 50, 60, 54, 62, and 56 may be coupled by one or more communication channels 63. Applications 68 (includes modules 32, 34, 36, and 37) and operating system 66 may also communicate information with one another as well as with other components in server device 30.

Processors 50, in one example, are configured to implement functionality and/or process instructions for execution within server device 30. For example, processors 50 may be capable of processing instructions stored in storage devices 56.

One or more storage devices 56 may be configured to store information within server device 30 during operation. Storage device 56, in some examples, is described as a computer-readable storage medium. In some examples, storage device 56 is a temporary memory, meaning that a primary purpose of storage device 56 is not long-term storage. Storage device 56 in some examples, is described as a volatile memory, meaning that storage device 56 does not maintain stored contents when the computer is turned off. Examples of volatile memories include random access memories (RAM), dynamic random access memories (DRAM), static random access memories (SRAM), and other forms of volatile memories known in the art. In some examples, storage device 56 is used to store program instructions for execution by processors 50. Storage device 56, in one example, is used by software or applications running on server device 30 (e.g., applications 68) to temporarily store information during program execution.

Storage devices 56, in some examples, also include one or more computer-readable storage media. Storage devices 56 may be configured to store larger amounts of information than volatile memory. Storage devices 56 may further be configured for long-term storage of information. In some examples, storage devices 56 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 30, in some examples, also includes one or more communication units 54. Server device 30, in one example, utilizes communication unit 54 to communicate with external devices via one or more networks, such as one or more wireless networks. Communication unit 54 may be a network interface card, such as an Ethernet card, an optical transceiver, a radio frequency transceiver, or any other type of device that can send and receive information. Other examples of such network interfaces may include Bluetooth, 3G and WiFi radios computing devices as well as USB. In some examples, server device 30 utilizes communication unit 54 to wirelessly communicate with an external device such as client device 10 of FIG. 1, or any other computing device.

Server device 30, in one example, also includes one or more input devices 60. Input device 60, in some examples, is configured to receive input from a user through tactile, audio, or video feedback. Examples of input device 60 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 62 may also be included in server device 30. Output device 62, in some examples, is configured to provide output to a user using tactile, audio, or video stimuli. Output device 62, in one example, includes a presence-sensitive screen, a sound card, a video graphics adapter card, or any other type of device for converting a signal into an appropriate form understandable to humans or machines. Additional examples of output device 62 include a speaker, a cathode ray tube (CRT) monitor, a liquid crystal display (LCD), or any other type of device that can generate intelligible output to a user.

Server device 30 may include operating system 66. Operating system 66, in some examples, controls the operation of components of server device 30. For example, operating system 66, in one example, facilitates the interaction of applications 68 with processors 50, communication unit 54, storage device 56, input device 60, and output device 62. As shown in FIG. 2, applications 68 may include image recognition module 32, social group module 34, matching module 36, server module 37, and client device 10 as described in FIG. 1. Applications 68 may each include program instructions and/or data that are executable by server device 30. As one example, social group module 34 may include instructions that cause server device 30 to perform one or more of the operations and actions described in the present disclosure.

In accordance with aspects of the present disclosure, communication unit 54 may receive a request from client device 10 for generating suggested social groups for photo sharing. The request may include an image from client device 10, which may be further associated with a user. The user may be associated with a social networking service, such that the user has an account in the social networking service. Image recognition module 32 of server device 30 may identify an object in the image. For example, image recognition module 32, as shown in FIG. 2, may generate a confidence value indicating the probability that the portion of selected image data matches the object associated with the object signature. The confidence value indicates a degree of similarity between the one or more characteristics associated with the selected object and one or more characteristics associated with the social group, wherein the degree of similarity is within a range of degrees of similarity. The probability, or confidence score, may be compared to a predetermined value to determine if the probability is greater than the predetermined value. When the probability is greater than a predefined value, image recognition module 32 selects the object associated with the object signature. Image recognition module 32 then sends the selected objects to matching module 36 for continuing the selection of social group suggestions.

Social group module 34 then initiates matching of the image that includes to the object to the user's social groups by accessing a list of social groups that are associated with the user. The list of social groups may be included in social group data 42 and stored in the social group store 38. Matching module 36 matches characteristics of the social groups with characteristics associated with the object included in the image. Matching module 36 may match such characteristics based at least in part using matching techniques as described in FIG. 1. For example, matching module 36 may determine the confidence value by determining the degree of similarity between a characteristic associated with the object and a characteristic associated with a social group. In some examples, matching module 36 may use a contextual characteristic that is contextually related to a characteristic associated with the social group. A semantic relationship may exist between the contextual characteristic and the characteristic associated with the social group. An example of a semantic relationship between the contextual characteristic and characteristics of the associated social group is as described in FIG. 1, when the recognized object is a soccer ball, image recognition module 32 may associate characteristics such as "soccer" and "ball" with the object. Matching module 36 may determine that user 2 has a social group named "Soccer Fans."

Server device 30 may select a list of social groups to send to client device 10 that match objects included in the image. Communication unit 54 may then send to client device 10 indications of the social group(s) selected by server device 30. For example, communication unit 54 may send a list of the suggested social groups that are associated with characteristics that match characteristics of one or more objects in the image.

In another example, client device 10 of FIG. 1 may include an audio application for capturing audio. In some examples, client 10 may store one or more audio files. In one example, client 10 may generate an audio file based on sounds received by an audio input device, such as a microphone (e.g., input device 60). Server device 30 of FIG. 2 may receive the audio file from client device 10. An audio recognition module 39 of server device 30 may perform object recognition techniques as described in this disclosure to identify words in audio data of the audio file. Audio recognition module 39 may generate a confidence value using confidence value scoring techniques as described in this disclosure for indicating a degree of similarity between the one or more characteristics associated with the selected audio data and/or identified word, and one or more characteristics associated with the social group. When the confidence value is greater than a predefined value, audio recognition module 32 selects the object associated with the object signature. Audio recognition module 32 then sends the selected objects to matching module 36 for continuing the selection of social group suggestions.

Figure 3:
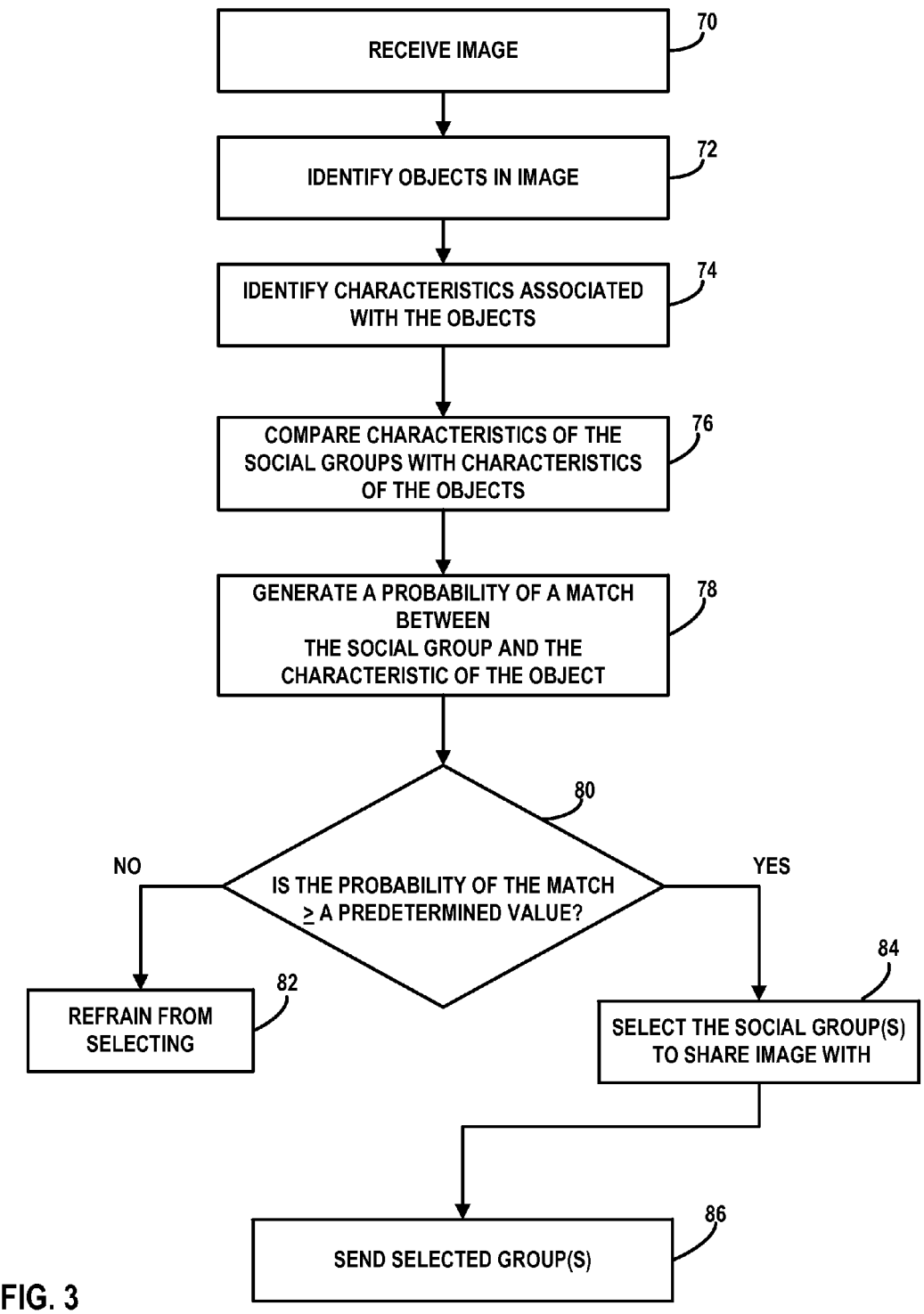
FIG. 3 is a flowchart illustrating an example of a server device selecting social groups based on identified characteristics associated with object in an image received by a client device, which is a computing device, in accordance with one or more aspects of the present disclosure.

FIG. 3 is a flow diagram illustrating example operations of that a server device may perform when suggesting social groups for an image received by client device, in accordance with one or more aspects of this disclosure. For purposes of illustration only, the example operations are described below within the context of server device 30 and client device 10 as shown in FIG. 1.

Initially, an image is received by server device 30 from client device 10 (70). Server device 30 may then perform the image recognition techniques of the disclosure to identify objects in the image (72). In some examples, client device 10 may further send information associated with the image, such as a number that uniquely identifies the image, the location where the image was captured using global positioning techniques, user defined tags, or any other data that is descriptive of the captured image. Server device 30 may subsequently determine characteristics associated with an object of the image (74).

Server device 30 may then compare the characteristics associated with the object to characteristics of social groups associated with the user (76). Social group data 42, as shown in FIG. 2, may include identifiers of social groups that are mapped to characteristics associated with the social groups. In some examples, each user account of the social networking service may be associated with one or more social groups that are included within the social network of user 2. For example, the characteristic "Soccer team" may be associated with a social group included in user 2's social network. The mapping between the social group and the characteristic "Soccer team" may be included in social group data 42.

Server device 30 may use full and/or partial string matching techniques determine matches between characteristics associated with the objects and characteristics associated with the social groups within the social network of user 2. To illustrate, if the recognized object is a soccer ball, characteristics such as "soccer" and "ball" may be associated with the object. Matching module 36 may determine that user 2 has a social group named "Soccer Fans." Consequently, matching module 36 may generate a confidence value by comparing the characteristics associated with the recognized object and comparing the characteristics against the name of social group, "Soccer Fans," associated with user 2 (78). The confidence value may indicate a likelihood or probability that the image, which includes the soccer ball object, is associated with the social group named "Soccer Fans."

Server device 30 may compare the confidence value (e.g., the probability of a match) to a predefined value to determine if the confidence value is greater than or equal to the predetermined value (80). When the probability of a match is greater than or equal to a predefined value, image recognition module 32 selects the corresponding social group (e.g., the social group having the characteristic that matches the characteristic associated with the object in the image) (84). If the probability is less than the predetermined value, image recognition module 32 can refrain from selecting the social groups and therefore refrain from suggesting that the image be associated with the social group (82). Image recognition module 32 then sends indications of the selected social groups to client device 10 (86).

Figure 4:
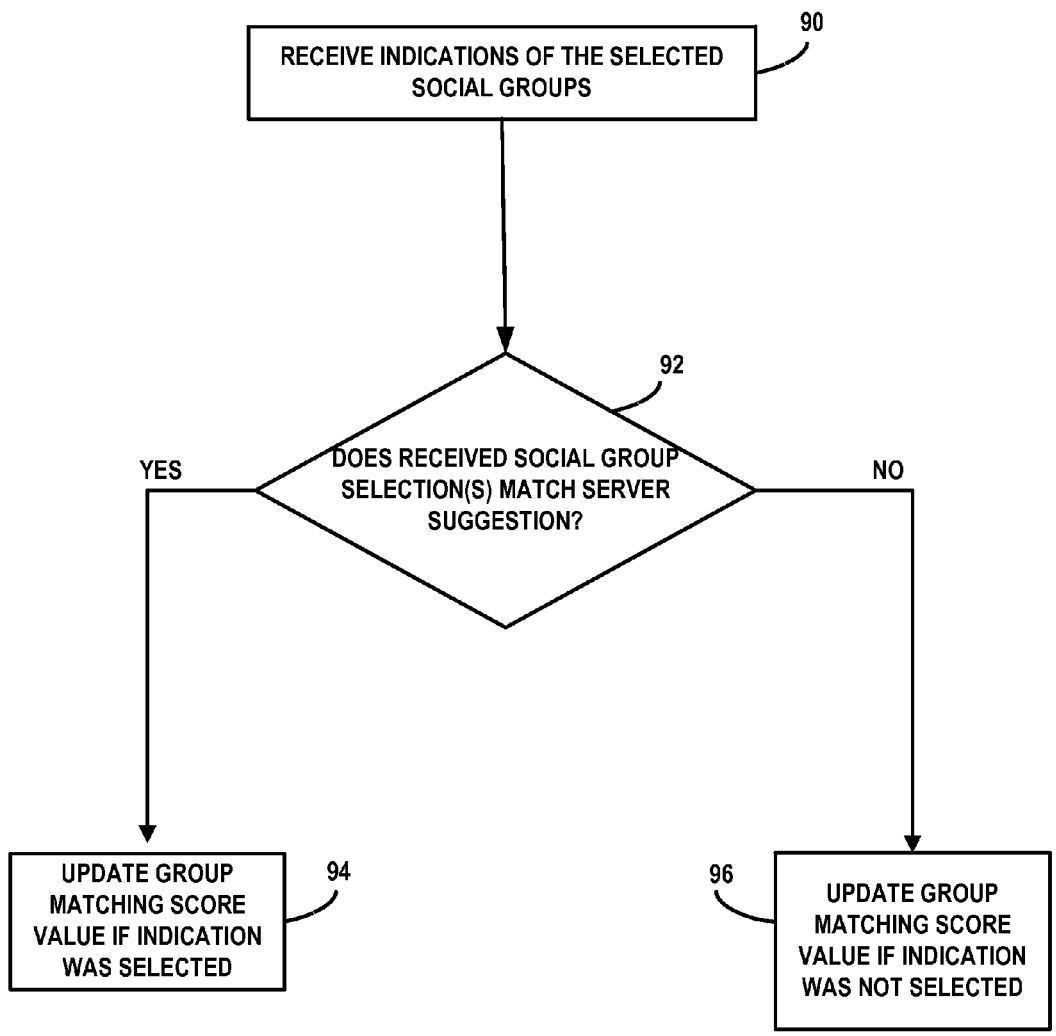
FIG. 4 is a flowchart illustrating an example of a server device suggesting social groups based on the user's social group selection, in accordance with one or more aspects of the present disclosure.

FIG. 4 is a flow diagram illustrating example operations that a server device may perform to improve social group suggestions based on learning the social group selections of a user, in accordance with one or more aspects of this disclosure. For purposes of illustration only, the example operations are described below within the context of server device 30 and client device 10 as shown in FIG. 1.

In some examples, server device 30 maintains a group matching score for each social group suggested by matching module 36. The group matching score may correspond to an association between the social group and an object of an image. For instance, a group matching score may correspond to an association between a social group "Parks" and an object identifier "tree" that may correspond to a tree in an image. Group matching scores may be used, in accordance with techniques of the disclosure, to determine a propensity of user 2 to associate an image having a specified object with the social group.

In one example, server device 30 may initially send a list of suggested social groups that user 2 may associate with an image previously uploaded by client device 10. Server device 30 may determine whether a group matching score exists for each suggested social group. If a group matching score does not exist between a suggested social group and an object included in the image, server device 30 may generate a corresponding group matching score. In some examples, a group matching score may be a value in a range between 0-1. In some examples, a group matching score may be initialized to a value of 0.5.

Once client device 10 has received the suggested social groups, user 2 may provide one or more selections to client device 10 to indicate which social groups will be associated with the image. After user 2 selects social groups, client device 10 may send indications of the selected social groups to server device 30. Social network module of client device 10 may send the selected social groups via network 100 to server device 30.

Server device 30 may then receive the indications of the selected social groups (90). Once received, server device 30 compares the indications of the social groups selected by user 2 with the social groups that were initially suggested by server device 30 (92). By comparing the indications, social group module 34 can determine if a selection of a social group made by a user matches a social group that was initially determined by server device 30.

In one example, the social group selected by the user to associate with the image matches a social group suggested by server device 30. Consequently, server device 30 may update the group matching score associated with the suggested social group to indicate that user 2's selection matches the suggested social group (94). In such examples, server module 30 may increment the group matching score associated with the selected social group (94). In another example, server device 30 may set the group matching score to a predetermined value, such as 0.75 as a high score value. By incrementing or setting the group matching score to a high score value, server module 30 indicates that a match exists between the suggested social group and the selection of the social group by the user. In this way, server device 30 may later use the group matching score to improve suggestions of social groups to user 2.

In some examples, a social group initially suggested by server device 30 may have been deselected by the user. Consequently, server device 30 may update the group matching score associated with the suggested social group to indicate the suggested social group was deselected by the user (96). In some examples, server device 30 may decrement the group matching score associated with the suggested social group. In another example, server device 30 may set the group matching score to a predetermined value, such as 0.1. By decrementing or setting the group matching score to a low score value, server module 30 indicates that the user changed his/ her selection to deselect the suggested social group. In this way, server device 30 may later use the group matching score to improve suggestions of social groups to user 2.

To illustrate the use of group matching scores to improve suggestions of social groups, server device 30 may receive another image from client device 10 that includes the same object as the image previously described in the example of FIG. 4. Server device 30 may initially determine one or more suggested social groups that could be associated with the image. Prior to sending indications of the suggested social groups to client device 10, server device 30 may further determine whether one or more of the suggested social groups are associated with group matching scores that are less than a predetermined value. For instance, if a predetermined value is 0.5 and a group matching score for a suggested social group was previously decremented to 0.3, server device 30 may determine that it will not suggest this particular social group (e.g., server device 30 will not send an indication of this social group to client device 10). Because a group matching score corresponds to an association between a social group and an object that may be identified in an image, server device 30 refrains from suggesting the social group, in the current example, when an image includes the object identified in the group matching score.

In some examples, server device 30 may implement techniques to reduce the effects of inadvertent and/or isolated user selections in the learning techniques described herein. For instance, server device 30 may refrain from decrementing or setting a group matching score the first time that user 2 has deselected a suggested social group. In one example, server device 30 may receive an indication that user 2 has deselected a social group that was initially selected. Rather than decrementing the group matching score, server device 30 may first determine whether the group matching score has been previously decremented in response to a user's decision to deselect a social group. If the scoring value has not been decremented at least one time, matching module 36 may refrain from decrementing the confidence score, to prevent prematurely decrementing the group matching score when, for example, user 2 mistakenly deselected the suggested social group. An internal counter may be used to track the number of times that a suggested social group was not selected. Internal counters may be implemented using hardware or a combination of hardware and software. For example, if the internal counter may be set to a predetermined number of occurrences, for example 3, then user 2 may choose not to select an image with a soccer ball in the image with the social group "Soccer Team" 3 times without decrementing the group matching score. The fourth subsequent occurrence that user 2 does not chose "Soccer Team" will decrement the group matching score. Matching module 36 then updates the group mapping score after the fourth occurrence.

Figure 5:
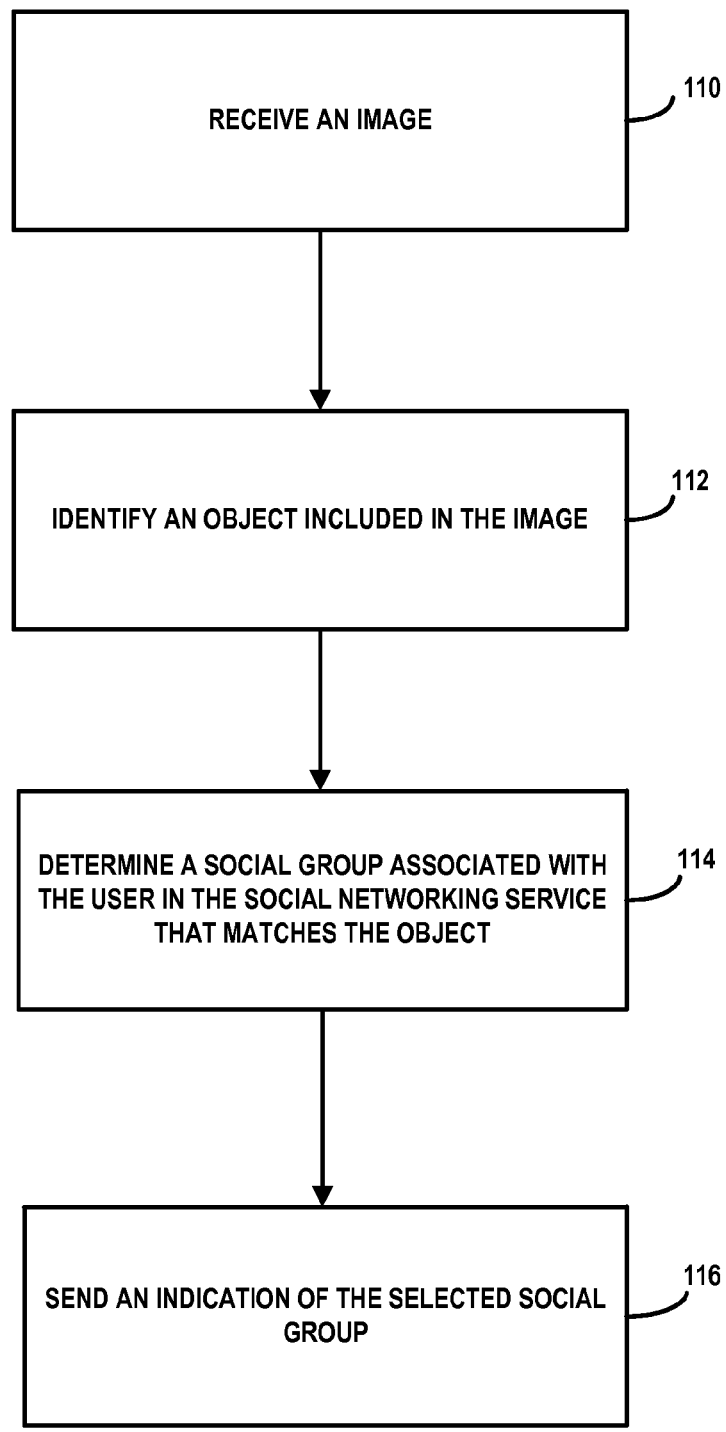
FIG. 5 is a flowchart illustrating an example of the server device generating an indication of the social groups, selected by the server device as suggestions, in accordance with one or more aspects of the present disclosure.

FIG. 5 is a flow diagram illustrating example operations that a server device may perform to improve social group suggestions based on learning the social group selections of a user, in accordance with one or more aspects of this disclosure. For purposes of illustration only, the example operations are described below within the context of server device 30 and client device 10 as shown in FIG. 1.

In one example, server device 30 receives an image from client device 10 (110). User 2 may be associated with a social networking service and client device 10. Server device 30 may, upon receiving the image, perform image recognition techniques to identify an object included in the image. Server device 30 may compare characteristics associated with the object to characteristics of social groups associated with user 2 in the social networking service to select determine a social group that may be associated with the image that includes the object (114). Server device 30 may then send an indication of the selected social group to client device 10 (116), so that user 2 may view the generated suggestions and select from social groups within the social networking service to share the image with.

In one example, the method includes receiving, by a first computing device and from a second computing device, an image, wherein a user is associated with a social networking service and the second computing device; identifying, by the first computing device, an object included in the image; selecting, by the first computing device, a social group associated with the user in the social networking service, the selecting being based at least in part on one or more characteristics associated with the object; and sending, by the first computing device to the second computing device, an indication of the social group selected by the first computing device. In another example, the indication comprises a list of social groups associated with the user in the social networking service. In another example, wherein the image is at least one of a photo, video, or document.

In one example, identifying the object included in the image further comprises: determining, by the first computing device, a portion of image data from the image; determining, by the first computing device, an image signature that represents the portion of selected image data; determining, by the first computing device, a confidence value that indicates a likelihood that the image signature matches an object signature associated with the object; when the confidence value is greater than a predetermined value, selecting, by the first computing device, the object associated with the object signature.

In another example, selecting the social group associated with the user in the social networking service further comprises: determining, by the first computing device, a confidence value that indicates a degree of similarity between the one or more characteristics associated with the selected object and one or more characteristics associated with the social group, wherein the degree of similarity is within a range of degrees of similarity; when the confidence value is greater than a predetermined value, selecting, by the first computing device, the social group.

In one example, the method includes determining the confidence value that indicates the degree of similarity between the one or more characteristics associated with the selected object and one or more characteristics associated with the social group, further comprises: determining, by the first computing device, a confidence value that indicates a degree of similarity between at least one characteristic of the one or more characteristics associated with the selected object and a contextual characteristic that is contextually related to the at least one characteristic of the one or more characteristics associated with the social group, wherein a semantic relationship exists between the contextual characteristic and the at least one characteristic of the one or more characteristics associated with the social group; and when the confidence value is greater than a predetermined value, selecting, by the first computing device, the social group.

In another example, the method includes sending, by the first computing device, the indication of the social group for display at the second computing device to enable the user associated with the second computing device to associate the image with the social group. In one example, the method further includes sending, by the first computing device, indications of all social groups associated with the user in the social networking service for display at the second computing device, wherein the social group selected by the first computing device is indicated as a selected social group within the indications of all social groups.

In another example, receiving, by the first computing device and from the second computing device, descriptive information associated with the image, wherein the descriptive information describes the image; and associating, by the first computing device, the descriptive information with the image in the social networking service. In another example, the method further includes associating, by the first computing device, at least a portion of the descriptive information with the object, such that the portion of the descriptive information is a characteristic associated with the object.

In one example, the method includes, receiving, by the first computing device and from the second computing device, an indication to associate the image with a selected social group that has been selected by a user associated with the second computing device; and associating, by the first computing device, the image with the selected social group in the social networking service.

In another example, wherein the user that is associated with the second computing device is a first user, the method further includes storing, by the first computing device, the image; determining, by the first computing device, a second user in the social networking service is associated with the social group selected by the first user; and sending, by the first computing device, an indication of the image to a computing device associated with the second user. In another example, the method further includes preventing access, by the first computing device, to the image by each user in the social networking service that is not associated with the social group.

In one example, the method further includes, in response to receiving the indication to associate the image with the selected social group, determining, by the first computing device, whether a match exists between the social group selected by the first computing device and the selected social group received from the second computing device. When the match exists, incrementing, by the first computing device, a matching score that is associated with an association between the social group selected by the first computing device and the object identified by the first computing device.

In another example, when the match does not exist, decrementing, by the first computing device the matching score that is associated with the association between the social group selected by the first computing device and the object identified by the first computing device. In one example, wherein decrementing the matching score further includes when the match does not exist, decrementing, by the first computing device, a secondary score associated with the matching score. When the secondary score is less than a predetermined value, decrementing, by the first computing device, the matching score. When the secondary score is not less than the predetermined value, not decrementing, by the first computing device, the matching score.

In another example the method further includes receiving, by the first computing device, a second image from the second computing device, wherein the user is associated with the second computing device and the social networking service. The method may further include identifying, by the first computing device, an object included in the second image; selecting, by the first computing device, a social group associated with the user in the social networking service, the selecting being based at least in part on one or more characteristics associated with the object. The method may further include determining, by the first computing device, whether a matching score associated with the object and the social group selected by the first computing device is greater than a predetermined value. When the matching score is greater than the predetermined value, sending, by the first computing device to the second computing device, an indication of the social group selected by the first computing device. In one example, when the matching score is not greater than the predetermined value, refraining from sending, by the first computing device to the second computing device, the indication of the social group selected by the first computing device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache). Various embodiments have been described. These and other embodiments are within the scope of the following claims.

What is claimed is:

1. A method comprising:
receiving, by a first computing device and from a second computing device, an image, wherein a user is associated with a social networking service and the second computing device;
recognizing, by the first computing device, an object included in the image by at least:
determining, by the first computing device, a portion of image data from the image;
determining, by the first computing device, an image signature that represents the portion of selected image data;
determining, by the first computing device, a first confidence value that indicates a likelihood that the image signature matches an object signature associated with the object; and
in response to determining that the first confidence value is greater than a first predetermined value, selecting, by the first computing device, the object associated with the object signature;
identifying, by the first computing device, one or more characteristics of the object;
determining, by the first computing device, a second confidence value that indicates a degree of similarity between at least one characteristic of the one or more characteristics of the object and a contextual characteristic that is contextually related to at least one characteristic associated with a social group associated with the user and the social networking service, wherein a semantic relationship exists between the contextual characteristic and the at least one characteristic associated with the social group;
in response to determining that the second confidence value is greater than a second predetermined value, selecting, by the first computing device, the social group; and
sending, by the first computing device, to the second computing device, an indication of the social group.

2. The method of claim 1, wherein the indication comprises a list of social groups associated with the user in the social networking service.

3. The method of claim 1, wherein sending the indication of the social group further comprises:
sending, by the first computing device, the indication of the social group for display at the second computing device to enable the user to associate the image with the social group.

4. The method of claim 1, wherein sending the indication of the social group further comprises:
sending, by the first computing device, indications of all social groups associated with the user in the social networking service for display at the second computing device, wherein the social group selected by the first computing device is indicated as a selected social group within the indications of all social groups.

5. The method of claim 1, further comprising:
receiving, by the first computing device and from the second computing device, descriptive information associated with the image, wherein the descriptive information describes the image; and
associating, by the first computing device, the descriptive information with the image in the social networking service.

6. The method of claim 5, further comprising:
associating, by the first computing device, at least a portion of the descriptive information with the object, such that the portion of the descriptive information is a characteristic of the object.

7. The method of claim 1, further comprising:
receiving, by the first computing device and from the second computing device, an indication to associate the image with a selected social group that has been selected by the user; and
associating, by the first computing device, the image with the selected social group in the social networking service.

8. The method of claim 7, wherein the user is a first user, the method further comprising:
storing, by the first computing device, the image;
determining, by the first computing device, that a second user in the social networking service is associated with the social group selected by the first user; and
sending, by the first computing device, an indication of the image to a computing device associated with the second user.

9. The method of claim 7, further comprising:
preventing access, by the first computing device, to the image by each user in the social networking service that is not associated with the social group.

10. The method of claim 7, further comprising:
in response to receiving the indication to associate the image with the selected social group, determining, by the first computing device, whether a match exists between the social group selected by the first computing device and the selected social group received from the second computing device;
in response to determining that the match exists, incrementing, by the first computing device, a matching score that is associated with an association between the social group selected by the first computing device and the object.

11. The method of claim 10, further comprising:
in response to determining that the match does not exist, decrementing, by the first computing device, the matching score that is associated with the association between the social group selected by the first computing device and the object.

12. The method of claim 11, wherein decrementing the matching score further comprises:
in response to determining that the match does not exist, decrementing, by the first computing device, a secondary score associated with the matching score;
in response to determining that the secondary score is less than a predetermined value, decrementing, by the first computing device, the matching score; and
in response to determining that the secondary score is not less than the predetermined value, not decrementing, by the first computing device, the matching score.

13. The method of claim 1, further comprising:
receiving, by the first computing device, a second image from the second computing device;
recognizing, by the first computing device, an object included in the second image;
identifying, by the first computing device, one or more characteristics of the object included in the second image;
selecting, by the first computing device, a social group associated with the user in the social networking service, the selecting being based at least in part on the one or more characteristics of the object included in the second image;

determining, by the first computing device, whether a matching score associated with the object included in the second image and the social group selected by the first computing device is greater than a predetermined value; and in response to determining that the matching score is greater than the predetermined value, sending, by the first computing device to the second computing device, an indication of the social group selected by the first computing device.

14. The method of claim 13, further comprising:

in response to determining that the matching score is not greater than the predetermined value, refraining from sending, by the first computing device to the second computing device, the indication of the social group selected by the first computing device.

15. The method of claim 1, wherein the image comprises at least one of a visual image and an audio image.

16. The method of claim 15, wherein the visual image is at least one of a photo, video, or document.

17. A computer-readable storage device encoded with instructions that, when executed, cause one or more processors of a first computing device to perform operations comprising:

receiving, by the first computing device and from a second computing device, an image, wherein a user is associated with the second computing device;

recognizing, by the first computing device, an object associated with the image by at least:

determining a portion of image data from the image;

determining an image signature that represents the portion of selected image data;

determining a first confidence value that indicates a likelihood that the image signature matches an object signature associated with the object; and in response to determining that the first confidence value is greater than a predetermined value, selecting the object associated with the object signature;

identifying, by the first computing device, one or more characteristics of the object;

determining a second confidence value that indicates a degree of similarity between at least one characteristic of the one or more characteristics of the object and a contextual characteristic that is contextually related to at least one characteristic associated with a social group associated with the user and a social networking service, wherein a semantic relationship exists between the contextual characteristic and the at least one characteristic associated with the social group; and in response to determining that the second confidence value is greater than a second predetermined value, selecting the social group; and sending, by the first computing device, to the second computing device, an indication of the social group.

18. The computer-readable storage device of claim 17, further encoded with instructions that, when executed, cause one or more processors of the first computing device to perform operations comprising:

sending the indication of the social group for display at the second computing device to enable the user to associate the image with the social group.

19. The computer-readable storage device of claim 17, further encoded with instructions that, when executed, cause one or more processors of the first computing device to perform operations comprising:

receiving, from the second computing device, an indication to associate the image with a selected social group that has been selected by a user associated with the second computing device; and associating, by the first computing device, the image with the selected social group in the social networking service.

20. The computer-readable storage device of claim 19, further encoded with instructions that, when executed, cause one or more processors of the first computing device to perform operations comprising:

in response to receiving the indication to associate the image with the selected social group, determining, whether a match exists between the social group selected by the first computing device and the selected social group received from the second computing device;

in response to determining that the match exists, incrementing, by the first computing device, a matching score that is associated with an association between the social group selected by the first computing device and the object recognized by the first computing device.

21. The computer-readable storage device of claim 19, further encoded with instructions that, when executed, cause one or more processors of the first computing device to perform operations comprising:

in response to determining that the match does not exist, decrementing, by the first computing device the matching score that is associated with the association between the social group selected by the first computing device and the object identified by the first computing device.

22. The computer-readable storage device of claim 19, further encoded with instructions that, when executed, cause one or more processors of the first computing device to perform operations comprising:

in response to determining that the match does not exist, decrementing, by the first computing device, a secondary score associated with the matching score;

in response to determining that the secondary score is less than a predetermined value, decrementing, by the first computing device, the matching score; and in response to determining that the secondary score is not less than the predetermined value, not decrementing, by the first computing device, the matching score.

23. A computing device, comprising:

one or more processors;

one or more modules operable by the one or more processors to:

receive, from a remote computing device, an image, wherein a user is associated with a social networking service and the second computing device;

recognize an object included in the image by at least:

determine a portion of image data from the image;

determine an image signature that represents the portion of selected image data;

determine a first confidence value that indicates a likelihood that the image signature matches an object signature associated with the object; and in response to determining that the first confidence value is greater than a first predetermined value, selecting the object associated with the object signature;

identify one or more characteristics of the object;
determine a second confidence value that indicates a degree of similarity between at least one characteristic of the one or more characteristics of the object and a contextual characteristic that is contextually related to at least one characteristic associated with a social group associated with the user and the social networking service, wherein a semantic relationship exists between the contextual characteristic and the at least one characteristic associated with the social group;
select a social group associated with the user and the social networking service, the selecting being based at least in part on the one or more characteristics in response to determining that the second confidence value is greater than a second predetermined value, selecting, by the first computing device, the social group; and
send, to the remote computing device, an indication of the social group.

24. The computing device of claim 23, wherein the one or more modules operable by the one or more processors to send, to the remote computing device, an indication of the social group are operable by the one or more processors to send, to the remote computing device, the indication of the social group for display at the remote computing device to enable the user to associate the image with the social group.

25. The computing device of claim 23, wherein the one or more modules operable by the one or more processors to send, to the remote computing device, an indication of the social group are operable by the one or more processors to send, to the remote computing device, indications of all social groups associated with the user in the social networking service for display at the remote computing device, wherein the social group selected by the one or more processors is indicated as a selected social group within the indications of all social groups.

26. The computing device of claim 23, wherein the one or more modules are further operable by the one or more processors to:
receive, from the remote computing device, descriptive information associated with the image, wherein the descriptive information describes the image; and
associate the descriptive information with the image in the social networking service.

27. The computing device of claim 23, wherein the one or more modules are further operable by the one or more processors to:
receive, from the remote computing device, an indication to associate the image with a selected social group that has been selected by the user; and
associate the image with the selected social group in the social networking service.

28. The computing device of claim 27, wherein the one or more modules are further operable by the one or more processors to:
in response to receiving the indication to associate the image with the selected social group, determine whether a match exists between the social group selected by the one or more processors and the selected social group received from the remote computing device; and
in response to determining that the match exists, increment a matching score that is associated with an association between the social group selected by the one or more processors and the object.

29. The computing device of claim 28, wherein the one or more modules are further operable by the one or more processors to:
in response to determining that the match does not exist, decrement the matching score that is associated with the association between the social group selected by the one or more processors and the object.

* * * * *